United States Patent Office 3,780,101
Patented Dec. 18, 1973

3,780,101
BICYCLIC COMPOUNDS
Hermann Bretschneider and Kraft Hohenlohe-Oehringen, Innsbruck, Austria, assignors to Hoffmann-La Roche Inc., Nutley, N.J.
No Drawing. Filed Nov. 19, 1971, Ser. No. 200,602
Int. Cl. C07c 127/00
U.S. Cl. 260—553 D  6 Claims

ABSTRACT OF THE DISCLOSURE

Hypoglycemically active 1-[2-hydroxy-2,3,3-trimethyl-7-anti-norbornyl]-3-(arylsulfonyl)ureas are described.

BRIEF SUMMARY OF THE INVENTION

The invention relates to 1-[2-hydroxy-2,3,3-trimethyl-7-anti-norbornyl]-3-(arylsulfonyl)ureas characterized by the formula

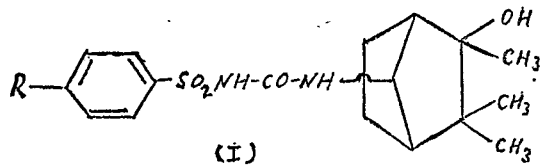

wherein R is hydrogen, halogen, amino, methyl or methylthio, and salts thereof with pharmaceutically acceptable bases. The compounds of Formula I possess hypoglycemic activity and are therefore useful as anti-diabetic agents.

In another aspect, the invention relates to intermediates of the formula

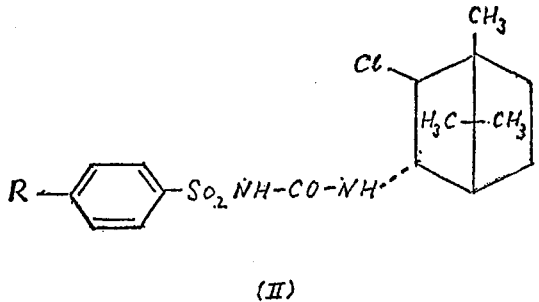

wherein R is as previously described.

DETAILED DESCRIPTION OF THE INVENTION

The invention relates to compounds of the formula

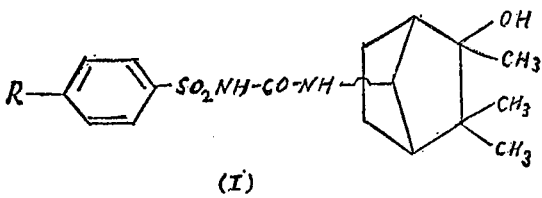

wherein R is hydrogen, halogen, amino, methyl or methylthio, and salts thereof with pharmaceutically acceptable bases.
The compounds of Formula I possess hypoglycemic activity and are therefore useful as anti-diabetic agents.

A preferred embodiment comprises 1-[(1S)-2-endo (and/or exo)hydroxy-2,3,3-trimethyl-7-anti-norbornyl]-3-(p-tolylsulfonyl)urea.

As used herein, the term "halogen" includes fluorine, chlorine, bromine and iodine; chlorine and bromine are preferred.

The bicyclic compounds of Formula I are prepared by treating a compound characterized by the formula

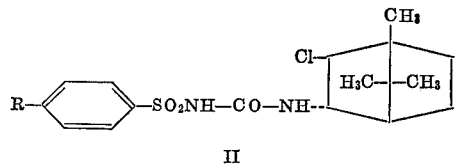

wherein R is as previously described, with an inorganic base, preferably an alkali metal hydroxide, such as sodium hydroxide or potassium hydroxide.

The starting materials of Formula II can be prepared from the corresponding known hydroxy-substituted compounds, i.e., by replacing the hydroxy group by a chlorine atom in accordance with known methods.

A compound of Formula I forms salts with pharmaceutically acceptable bases and such salts are also within the scope of this invention. Thus, a compound of Formula I forms salts with pharmaceutically acceptable bases which preferably include alkali metal bases such as sodium hydroxide, potassium hydroxide and the like, or alkaline earth metal bases such as calcium hydroxide. Strong organic bases such as tetraethyl ammonium hydroxide can also be used.

The invention includes within its purview the geometric isomers differing in the position of the hydroxy group, i.e., indo or exo, with respect to the camphene skeleton. The separation of the mixture of geometric (endo/exo) isomers can be carried out by known procedures, preferably by fractional crystallization.

The compounds of Formula I are distinguished by their blood sugar depressant activity on oral administration; thus, they are useful as hypoglycemic agents or as antidiabetic agents. Their useful hypoglycemic properties are manifested upon administration to warm-blooded animals. For example, on oral administration of 1-[(1S)-2-hydroxy-2,3,3-trimethyl - 7 - anti-norbornyl]-3-(p-tolylsulfonyl)urea to a dog, the following blood glucose values were observed:

| Dosage (mcmol/kg.) | Percent deviation from the initial value after— | | | |
| --- | --- | --- | --- | --- |
| | 2 hours | 4 hours | 6 hours | 24 hours |
| 100 | −33 | −38 | −34 | −20 |
| 30 | −16 | −10 | −3 | +1 |
| 10 | −18 | −19 | −5 | +13 |

The 1-[(1S) - 2 - hydroxy-2,3,3-trimethyl - 7 - anti-norbornyl] - 3 - (p - tolylsulfonyl)urea has demonstrated an $LD_{50}$ of 5 g./lkg. in the mouse on oral administration.

A compound of Formula I can be used as a medicament in the form of tablets, capsules or dragées. Suitable dosage units contain from about 250 to 1000 mg., preferably from about 250 to 500 mg. Suitable dosage regimens in warm-blooded animals are from about 5 mg./kg. per day to about 15 mg./kg. per day, preferably 7 mg./kg. per day to about 10 mg./kg. per day, but for any particular subject, the specific dosage regimen should be adjusted according to individual need and professional judgment of the person administering or supervising the administration of a compound of Formula I.

Suitable pharmaceutical preparations can contain a bicyclic compound of Formula I together with a compatible pharmaceutical carrier. Such a carrier can comprise an organic or inorganic inert carrier material suitable for enteral or parenteral administration, such as, for example, water gelatin, gum arabic, lactose, starches, magnesium stearate, talc, polyalkyleneglycols and the like. The pharmaceutical preparations can be made up in solid form, for example, tablets, dragées or capsules, or in liquid form, for example, solutions. They may be sterilized and/or may contain adjuvants such as preserving, stabilizing, wetting or emulsifying agents, salts for varying the osmotic pressure or buffers. They can also contain other therapeutically valuable substances.

The following examples further illustrate the invention. All temperatures are in degrees centigrade, unless otherwise mentioned.

Example 1.—Preparation of 1-[(1S)-2-hydroxy-2,3,3-trimethyl-7-anti-norbornyl]-3-(p-tolylsulfonyl)urea 20 g. of 1-[(1R)-2-exo-chloro - 3 - endo-bornyl]-3-(p-tolylsulfonyl)urea are introduced over a period of 20 minutes into 500 ml. of ice-cold 0.5 N sodium hydroxide. After stirring at 5° C. for 0.5 hour, the mixture is brought to a pH 1 by the addition of dilute hydrochloric acid and extracted with ethyl acetate. The extract is washed with water and evaporated. The resulting residue yields 4.5 g. of 1-[(1S)-2-hydroxy-2,3,3-trimethyl-7-anti - norbornyl]-3-(p-tolylsulfonyl)urea having a melting point of 200° C. (decomposition) after recrystallization from acetone; $[\alpha]_D^{25} = -15.8°$ (10 percent in acetone).

The 1-[(1R)-2-exo-chloro - 3 - endo-bornyl] - 3 - (p-tolylsulfonyl)urea can be prepared as follows:

40 g. of 1-[(1R)-2-exo-hydroxy - 3 - endo-bornyl]-3-(p-tolylsulfonyl)urea are introduced with stirring over a period of 15 minutes with external ice-cooling into 50 ml. of thionyl chloride. After completion of the addition, the mixture is maintained at room temperature for an additional 30 minutes. Thereafter, the mixture, which solidifies as a jelly, is stirred with 300 ml. of ether. The chloride which is obtained in crystalline form is removed by filtration and washed with ether, and in turn yields 42.4 g. of 1-[(1R) - 2 - exo-chloro-3-endo-bornyl]-3-(p-tolylsulfonyl)urea having a melting point of 176°–178° C. (decomposition) from tetrahydrofuran/ether.

Example 2

Starting from 13 g. of 1-[(1R)-2-exo-chloro-3-endo-bornyl] - 3 - (p-chlorobenzenesulfonyl)-urea there is obtained by the procedure of Example 14, 8 g. of 1-[(1S)-2-hydroxy-2,3,3-trimethyl - 7 - anti-norbornyl] - 3 - (p-chlorobenzenesulfonyl)-urea of melting point 202–203°, $[\alpha]_D^{25} = 8.56°$ (10% in acetone).

1-[(1R) - 2 - exo - chloro-3-endo-bornyl] - 3 - (p-chlorobenzenesulfonyl)-urea is obtained from 1-[(1R)-2-exo-hydroxy-3-endo-bornyl] - 3 - (p-chlorobenzenesulfonyl)-urea and thionyl chloride. The compound melts at 144–147°.

Example 3

17 g. of 1-[(1R)-2-exo-chloro-3-endo-bornyl] - 3 - (p-methylthiobenzenesulfonyl)-urea (M.P. 84–87°) are added within 10 minutes to 600 ml. of ice cold 0.5 N sodium hydroxide. To this mixture, 600 ml. of ice cold ethyl acetate are immediately added and the mixture is vigorously stirred for 0.5 hour. The aqueous alkaline phase is separated from the organic solvent and adjusted to pH 1 by the addition of 3 N hydrochloric acid at 5° C. The precipitate is filtered off, washed with water and dried in vacuo at 35°. Recrystallisation from isopropyl acetate affords 3.6 g. of 1-[(1S)-2-hydroxy-2,3,3-trimethyl-7-anti-norbornyl]-3-(p-methylthiobenzenesulfonyl)-urea of melting point 102–103° C. $[\alpha]_D^{25} = -9.53°$ (2.5% in acetone).

Example 4

In an analogous manner to Example 1, there is obtained from 1-[(1R,S)-2-exochloro - 3 - endo-burnyl]-3-(p-tolyl-sulfonyl)-urea the compound 1 - [(1R,S)-2-hydroxy- 2,3,3 - trimethyl - 7 - anti-norbornyl]-3-(p-tolylsulfonyl)-urea.

Example 5

Tablets of the following composition are prepared utilizing conventional procedures:

|  | Mg. |
|---|---|
| 1-[(1S) - 2 - hydroxy - 2,3,3 - trimethyl-7-anti-norbornyl]-3-(p-tolylsulfonyl)-urea | 250 |
| Avicel | 450 |
| Corn starch | 45.5 |
| Magnesium stearate | 0.5 |
| Total | 750 |

We claim:
1. A compound selected from the group consisting of compounds of the formula

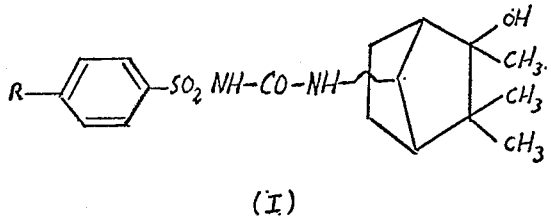

(I)

wherein R is hydrogen, halogen, amino, methyl or methylthio, and salts thereof with pharmaceutically acceptable bases.

2. A compound in accordance with claim 1, 1-[(1S)-2-hydroxy - 2,3,3 - trimethyl-7-anti-norbornyl]-3-p-tolylsulfonyl)-urea.

3. A compound in accordance with claim 1, 1-[(1S)-2-hydroxy-2,3,3-trimethyl - 7 - anti-norbornyl] - 3 - (p-chlorobenzenesulfonyl)-urea.

4. A compound in accordance with claim 1, 1-[(1S)-2-hydroxy - 2,3,3 - trimethyl-7-anti-anti-norbornyl] - 3 - (p-methylthiobenzenesulfonyl)-urea.

5. A process for the preparation of a compound of the formula

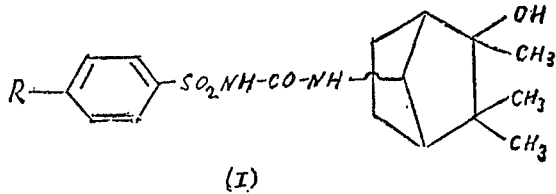

(I)

wherein R is hydrogen, halogen, amino, methyl or methylthio, which process comprises treating a compound of the formula

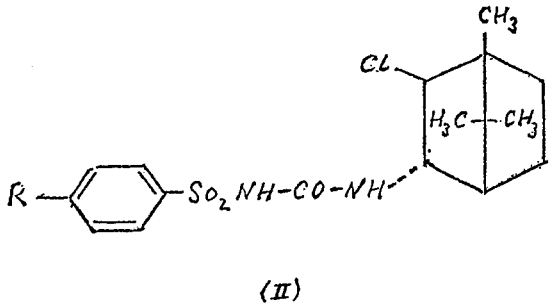

(II)

wherein R is hydrogen, halogen, amino, methyl or methylthio, with alkali metal hydroxide.

6. A process according to claim 5, wherein said alkali metal hydroxide is sodium hydroxide.

References Cited
UNITED STATES PATENTS
2,928,871   3/1960   Aeschlimann et al. _ 260—553 D
3,334,302   8/1967   Beregs et al. ____ 260—553 D X LEON ZITVER, Primary Examiner G. A. SCHWARTZ, Assistant Examiner U.S. Cl. X.R.

260—397.7, 999

UNITED STATES PATENT OFFICE
CERTIFICATE OF CORRECTION

Patent No. 3,780,101　　　　　　　　Dated December 18, 1973

Inventor(s) Hermann Bretschneider and Kraft Hohenlohe-Oehringen

It is certified that error appears in the above-identified patent and that said Letters Patent are hereby corrected as shown below:

Column 1, insert between lines 6 and 7:

Claims priority, application Switzerland, November 27, 1970, No. 17,561/70

Column 4, claim 2, line 25, "3-p-tolyl-" should be:

3-(p-tolyl-

Column 4, line 69, "Beregs et al." should be:

Beregi et al.

Signed and sealed this 16th day of July 1974.

(SEAL)
Attest:

McCOY M. GIBSON, JR.　　　　　　　C. MARSHALL DANN
Attesting Officer　　　　　　　　　Commissioner of Patents